(12) United States Patent
Shi et al.

(10) Patent No.: US 6,433,968 B1
(45) Date of Patent: Aug. 13, 2002

(54) MERGED READ/WRITE HEAD AND METHOD OF FABRICATING SAME

(75) Inventors: Zhupei Shi, San Jose; Aiguo Feng, Fremont, both of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/564,301

(22) Filed: May 2, 2000

(51) Int. Cl.[7] .................................................. G11B 5/39
(52) U.S. Cl. ....................................................... 360/317
(58) Field of Search ................................ 360/317, 120, 360/122, 125, 126, 113, 119

(56) References Cited

U.S. PATENT DOCUMENTS

| | | | | |
|---|---|---|---|---|
| 5,901,432 A | * | 5/1999 | Armstrong et al. .......... 205/122 |
| 5,995,342 A | * | 11/1999 | Cohen et al. ................ 360/126 |
| 6,125,018 A | * | 9/2000 | Takagishi et al. ............ 360/122 |
| 6,128,166 A | * | 10/2000 | Tanaka et al. ............... 360/317 |
| 6,141,857 A | * | 11/2000 | Furusawa et al. ......... 29/603.15 |
| 6,156,375 A | * | 12/2000 | Hu et al. ..................... 360/126 |
| 6,282,056 B1 | * | 8/2001 | Feng et al. .................. 360/126 |

* cited by examiner

Primary Examiner—David Hudspeth
Assistant Examiner—Angel Castro

(57) ABSTRACT

A merged thin film read/write head having a read element having a first shield layer, a second shield layer and a magnetoresistive element disposed between the first and second shield layers, a thin spacer layer of nonmagnetic material formed upon the second shield layer and an inductive write element having a first pole pedestal formed upon the spacer layer and a second pole separated from the pedestal by a gap. The pedestal includes a tapered portion for reducing the formation of pinned magnetic domains in the pedestal and providing improved flux passage. In combination with the thin nonmagnetic spacer layer, the tapered feature of the pedestal eliminates popcorn noise in the read element.

5 Claims, 7 Drawing Sheets

MERGED READ/WRITE HEAD AND METHOD OF FABRICATING SAME

BACKGROUND OF THE INVENTION

This invention relates generally to magnetic disk data storage systems, and more particularly to a merged read/write head having a tapered pedestal portion and method for fabricating the same.

Magnetic disk drives are used to store and retrieve data for digital electronic apparatus such as computers. In FIGS. 1A and 1B, a magnetic disk data storage system 10 of the prior art includes a sealed enclosure 12, a disk drive motor 14, a magnetic disk 16, supported for rotation by a drive spindle S1 of motor 14, an actuator 18 and an arm 20 attached to an actuator spindle S2 of actuator 18. A suspension 22 is coupled at one end of the arm 20, and at its other end to a read/write head or transducer 24. The transducer 24 (which will be described in greater detail with reference to FIG. 2A) typically includes an inductive write element with a sensor read element. As the motor 14 rotates the magnetic disk 16, as indicated by the arrow R, an air bearing is formed under the transducer 24 causing it to lift slightly off the surface of the magnetic disk 16, or, as it is termed in the art, to "fly" above the magnetic disk 16. Alternatively, some transducers, known as contact heads, ride on the disk surface. Various magnetic "tracks" of information can be written to and/or read from the magnetic disk 16 as the actuator 18 causes the transducer 24 to pivot in a short arc as indicated by the arrows P. The design and manufacture of magnetic disk data storage systems is well known to those skilled in the art.

FIG. 2A depicts a merged magnetic read/write head 24 including a substrate 25 above which a read element 26 and a write element 28 are disposed. Edges of the read element 26 and write element 28 also define an air bearing surface ABS, in a plane 29, which can be aligned to face the surface of the magnetic disk 16 (see FIGS. 1A and 1B). The read element 26 includes a first shield 30, an intermediate layer 32, which functions as a second shield, and a read sensor 34 that is located within a dielectric medium 35 between the first 30 shield 30 and the second shield 32. The most common type of read sensor 34 used in the read/write head 24 is the magnetoresistive (AMR or GMR) sensor, which is used to detect magnetic field signal changes in a magnetic medium by means of changes in the resistance of the read sensor imparted from the changing magnitude and direction of the magnetic flux being sensed.

The write element 28 is typically an inductive write element which includes the intermediate layer 32, which functions as a first pole, and a second pole 38 disposed above the first pole 32. The first pole 32 and the second pole 38 are attached to each other by a backgap portion (not shown), these three elements collectively forming a yoke (not shown). The combination of a first pole tip portion 43 and a second pole tip portion 45 near the ABS is sometimes referred to as the yoke tip portion 46. A write gap 36 is formed between the first and second poles 32 and 38 in the yoke tip portion 46. The write gap 36 is filled with a non-magnetic, electrically insulating material that forms a write gap material layer 37. This non-magnetic material can be either integral with (as is shown here) or separate from a first insulation layer 47 that lies below the second pole 38 and extends from the yoke tip portion 46 to the backgap portion.

Also included in write element 28 is a conductive coil 48, formed of multiple winds 49. The conductive coil 48 is shown positioned within the first insulation layer 47. The first insulation layer 47 thereby electrically insulates the winds 49 from each other and from the second pole 38.

An inductive write head such as that shown in FIGS. 2A and 2B operates by passing a writing current through the conductive coil layer 48. Because of the magnetic properties of the yoke, a magnetic flux is induced in the first and second poles 32 and 38 by write currents passed through the coil layer 48. The write gap 36 allows the magnetic flux to fringe out from the yoke tip portion 46 (thus forming a fringing gap field) and to cross a magnetic recording medium that is placed near the ABS.

A critical parameter of a magnetic write element is a trackwidth of the write element, which defines track density. For example, a narrower trackwidth can result in a higher magnetic recording density. The trackwidth is defined by the geometries in the yoke tip portion 46 (see FIG. 2A) at the ABS. These geometries can be better understood with reference to FIG. 2B. As can be seen from this view, the first and second poles 32 and 38 can have different widths W1 and W2 respectively in the yoke tip portion 46. In the shown configuration, the trackwidth of the write element 28 is defined by the width W2 of the second pole tip portion 45.

The fringing gap field of the write element can be further affected by the positioning of the zero throat level ZT and by the throat height TH, which is measured from the ABS to the zero throat level, as shown in FIG. 2A. The zero throat level is defined as the position where the first pole tip portion 43 and a second pole tip portion 45 converge at the write gap 36. In order to prevent flux leakage from the second pole 38 into the back portions of the first pole tip portion 43, it is desirable to provide a zero throat level in a well defined plane which is parallel to the plane of the ABS. Thus, accurate definition of the trackwidth, zero throat level and throat height is critical during the fabrication of the write element.

In order to provide accurate definition to one edge of the zero throat level a pedestal 42 may be formed on top of a first pole 32 as shown in FIG. 2C. The pedestal 42 is typically electroplated into photoresist cavities and provides for a structure having a well defined plane at the zero throat level which is parallel to the plane of the ABS.

The performance of the write element is further dependent upon the properties of the magnetic materials used in fabricating the poles of the write element. In order to achieve greater overwrite performance, magnetic materials having a high saturation magnetic flux density Bs are preferred. A common material employed in forming the poles is high Fe content (55 at % Fe) NiFe alloy having a Bs of about 16 kG. However, high Fe content NiFe alloy has a high magnetostriction constant $\lambda s$ (on the order of $10^{-5}$) which causes undesirable domain formation in the poles. It is known that the domain wall motion in the writer is directly related to an increase in false signals (popcorn noise) in the read element, especially when the motion occurs in the first pole, which also serves as a shield for the read element. Furthermore, domain walls formed in the pedestal are easily pinned at sharp corners and also easily activated thermally. Thermal activation of pinned domains induces magnetic domain wall motion in the shield 32 of the read element 26. The magnetic domain wall motion in shield 32 generates magnetic flux which passes through the MR sensor 34 of the read element 26 and results in a false signal in the read element 26 which degrades the performance of the magnetic read/write head 24.

Moreover, typical fabrication processes limit the formation of desirable pedestal features. An example of one such process is shown in the process diagram of FIG. 3. The 30 process 54 includes an operation 56 of pattern plating the second shield/first pole (S2/P1). The second shield/first pole is typically formed from NiFe alloy to a thickness of 1.6 μm. In an operation 58, a first pole (P1) pedestal formed of NiFe is pattern plated above the second shield/first pole. The as-plated pedestal thickness is 2 μm. In an operation 60, a protective alumina layer is sputter deposited on the wafer to provide electrical insulation between the first shield and the MR interconnect.

In an operation 62, a leads via is formed by wet etching through the alumina layer in order to establish the electrical connection with the read element. In an operation 64, the MR interconnect is formed by copper plating a pair of copper wires which connect the MR leads to the studs. In an operation 66, an alumina midcoat is deposited and in an operation 68, the wafer is planarized by a chemical/mechanical polish (CMP). During the CMP, some alumina and the top portions of the pedestal, back gap, and studs are removed. The final thickness of the pedestal is preferably 0.5–1 μm. The pedestal resulting from the described process 54 includes sharp edges at the zero throat, both at the write gap and at the interface between the pedestal and read element shield.

Therefore, there remains a need for a merged read/write head having a pedestal whose configuration substantially eliminates pinned domain wall formation and thereby reduces popcorn noise in the read element. Such a head preferably has a first pole pedestal having a tapered feature, the pedestal formed on a thin nonmagnetic spacer layer operable to de-couple the magnetic exchange interaction between the pedestal and the read element shield layer.

SUMMARY OF THE INVENTION

The present invention provides a merged read/write head having a tapered pedestal portion and a method for fabricating the same. The merged read/write head is of the type having a common layer which serves as both a magnetic shield for the read element and a first pole for the inductive write element. A thin nonmagnetic spacer layer is sputtered onto the common layer. A pedestal is then plated on top of the spacer layer. The pedestal has a first planar, air bearing surface in the plane of the ABS and an opposing surface facing the backgap. Due to the plating technique of the present invention, an outward tapered portion extending along the bottom edge of the pedestal opposing surface proximate the spacer layer and directed toward the backgap is formed. The tapered portion reduces formation of pinned magnetic domains in the pedestal, thereby improving flux passage and providing improved NLTS (non-linear transition shift) and reduced popcorn noise in the read element.

The method of fabricating the merged read/write head includes sputter depositing an ultra-thin nonmagnetic spacer layer onto the planarized surface of a wafer having a second MR shield/first pole and MR interconnect fabricated thereon. The pedestal, backgap and studs are then pattern plated on the spacer layer. A photoresist hard mask is then formed between the pedestal and backgap. A gap is left between the photoresist mask and the pedestal and backgap to promote the formation of a first tapered portion extending from the pedestal toward the backgap and a second tapered portion extending from the backgap toward the pedestal. A second plating operation of the pedestal and backgap forms the first and second tapered portions. Finally, an alumina midcoat is fabricated on the wafer, the midcoat is planarized to define the thickness of the pedestal, and the remaining layers including the write gap layer, coil layers and the second pole are fabricated to complete the merged read/write head.

For a fuller understanding of the nature and advantages of the present invention, reference should be made to the following detailed description taken together with the accompanying figures.

DETAILED DESCRIPTION OF PREFERRED EMBODIMENTS

Figure 11:
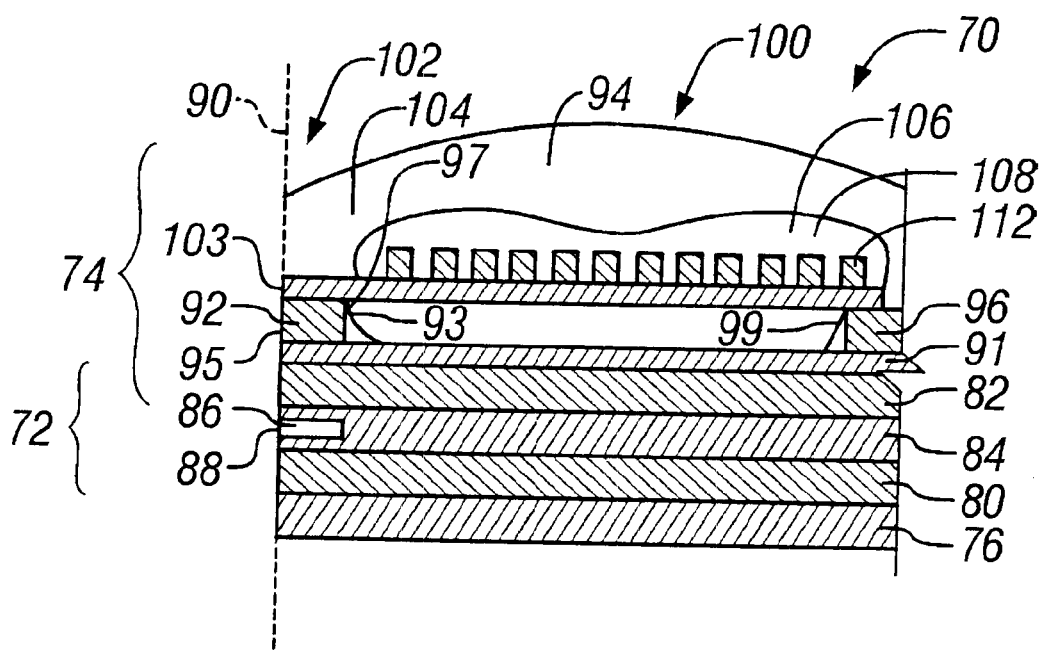
FIG. 11 is a cross sectional view of a read/write head in accordance with the present invention.

With reference to FIG. 11, the present invention is embodied in a merged read/write head 70 including a read element 72 and a write element 74 that are fabricated upon a substrate 76. The read element 72 includes first and second shields 80 and 82, separated by a first dielectric layer 84. A magnetoresistive read sensor 86 is embedded within the dielectric layer 84 and has an edge portion 88 at an air bearing surface (ABS) 90 of the read/write head 70.

The write element 74 includes a first pole formed from the second shield 82 and a second pole 94. The first pole 82 is preferably formed of permalloy. A pedestal 92 is fabricated upon a very thin nonmagnetic spacer layer 91 and includes a first planar air bearing surface 95 at the ABS and an opposing surface 97 which faces a backgap 96. The pedestal 92 further includes a first outward tapered portion 93 extending along the bottom edge of the pedestal opposing surface 97 adjacent the nonmagnetic spacer layer 91 and directed toward the backgap 96 and a second outward tapered portion 99 extending along the bottom edge of the backgap 96 toward the pedestal 92. The second shield/first pole 82 and the second pole 94 are virtually magnetically connected at the backgap 96 through the nonmagnetic spacer layer 91. The backgap 96, second pole 94 and second shield/first pole 82 form a yoke generally designated 100. At a yoke tip portion generally designated 102, a gap layer 103 separates a second pole tip portion 104 from the pedestal 92. Disposed in an open interior portion 106 of the yoke 100 is an insulating layer 108 including a conductive coil 112.

Figure 1A:
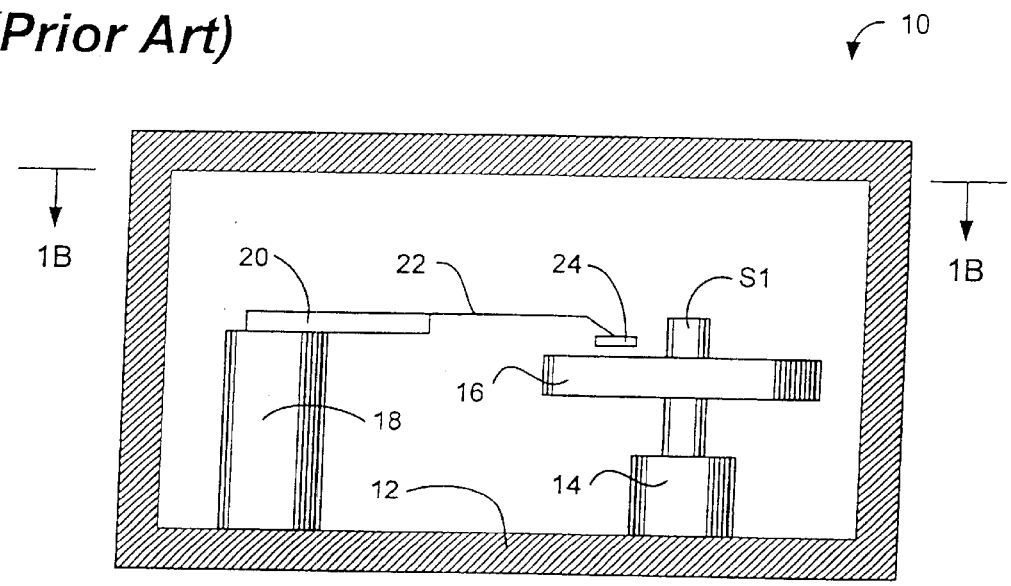
FIG. 1A is a partial cross-sectional front elevation view of a magnetic data storage system.
Figure 1B:
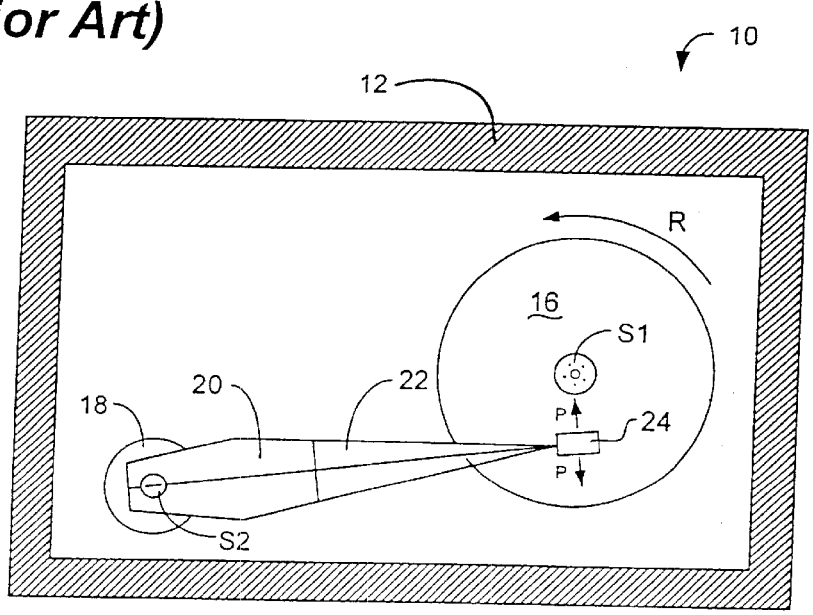
FIG. 1B is a top plan view taken along line 1B—1B of FIG. 1A.
Figure 2A:
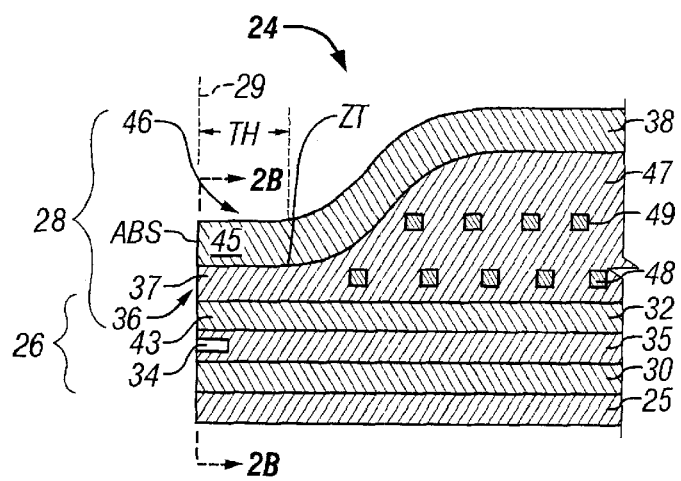
FIG. 2A is a cross-sectional view of a prior art read/write head of the magnetic disk drive assembly of FIGS. 1A and 1B.
Figure 2B:
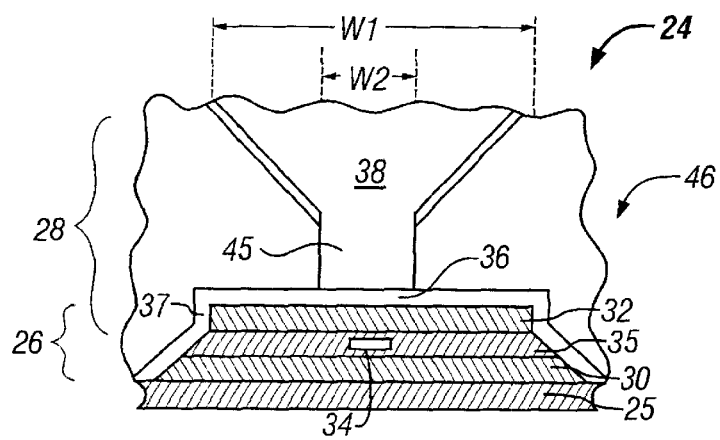
FIG. 2B is an ABS view taken along line 2B–2B of FIG. 2A.
Figure 2C:
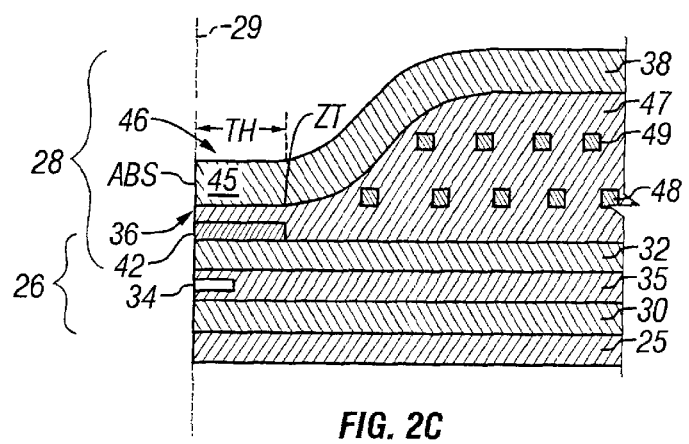
FIG. 2C is a cross-sectional view of a prior art inductive head showing a pedestal formed on a first pole.
Figure 3:
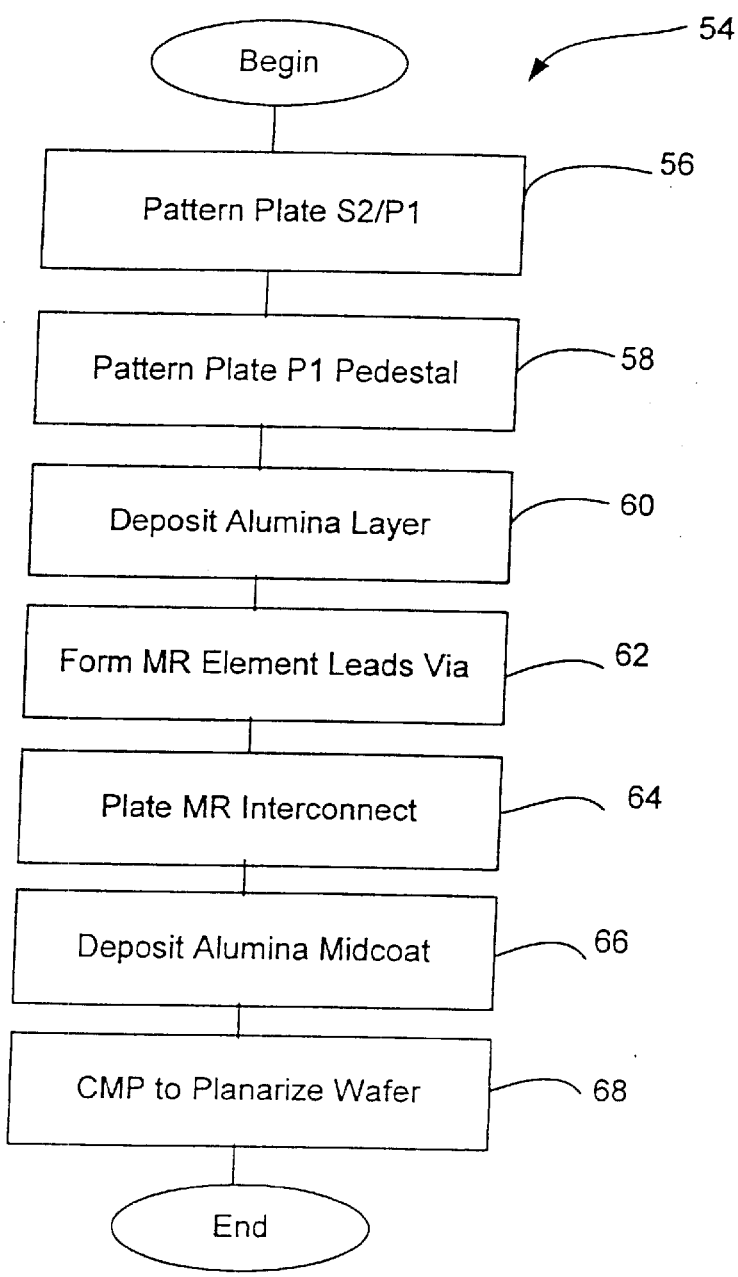
FIG. 3 is a prior art process diagram of a method for forming a pedestal on a first pole.
Figure 4:
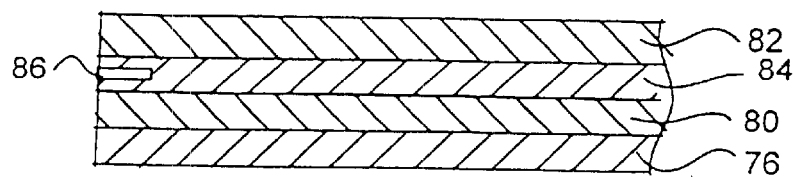
FIGS. 4–10 are cross sectional views of a read/write head of the present invention in progressive intermediate stages of development.
Figure 12:
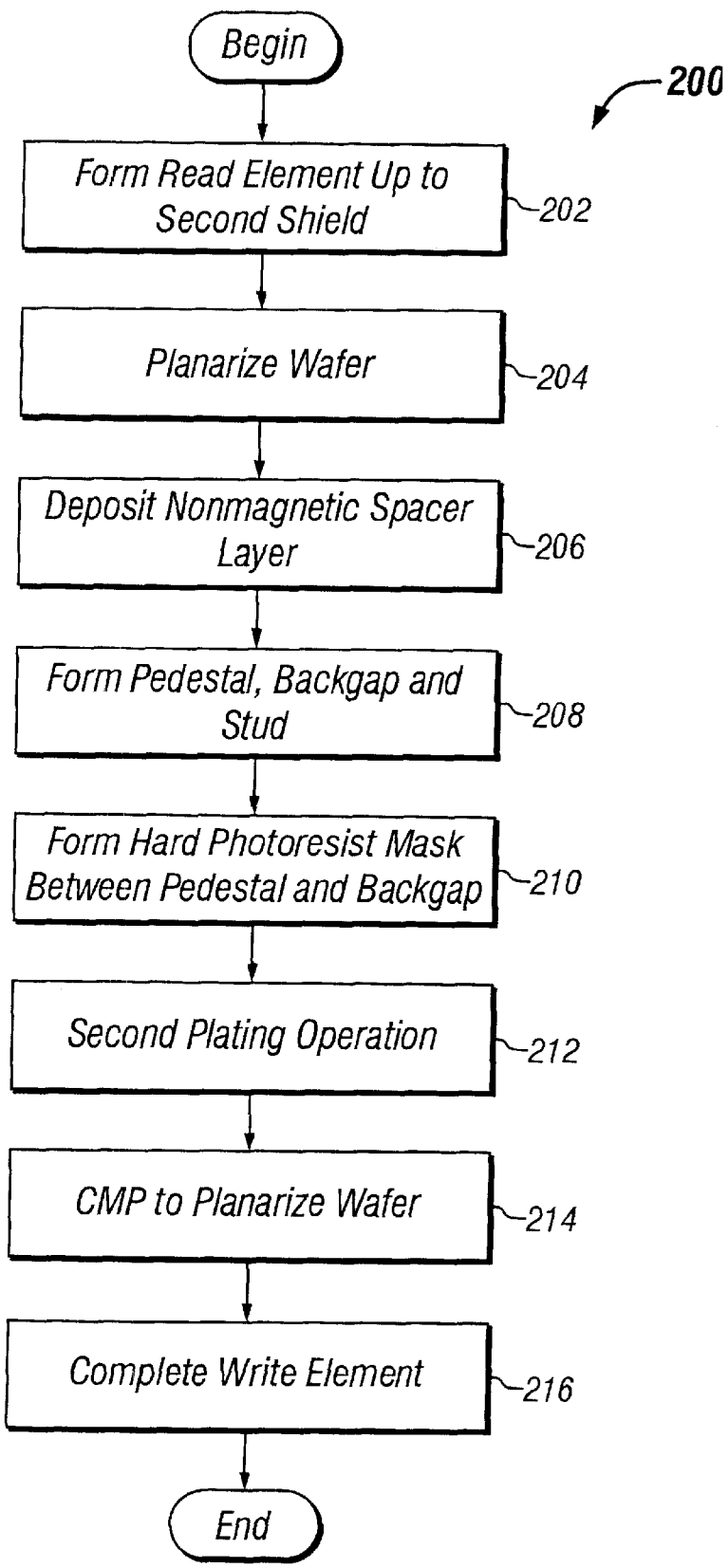
FIG. 12 is a process diagram of the method of the present invention.

With reference to FIG. 12, a process 200 for fabricating the head 70 of the present invention will be described. The read element 72 is formed in step 202 up to the second shield 82 and first midcoat (not shown). The wafer is then planarized in step 204 by a chemical/mechanical polish (see FIG. 4).

Figure 5:
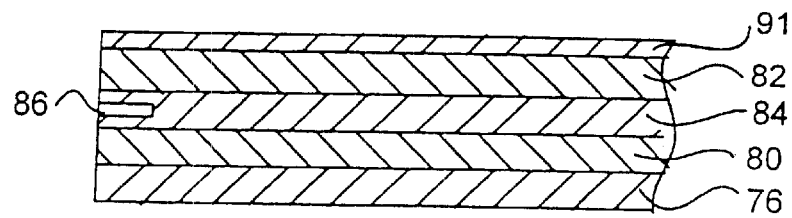

A nonmagnetic layer of Au or Ta is sputter deposited onto the planarized surface in step 206 to form a spacer layer 91 as shown in FIG. 5. The spacer layer is preferably between 50 and 100 Angstroms thick and effectively de-couples the magnetic exchange interaction between the pedestal 92 and the second shield 82.

Figure 6:
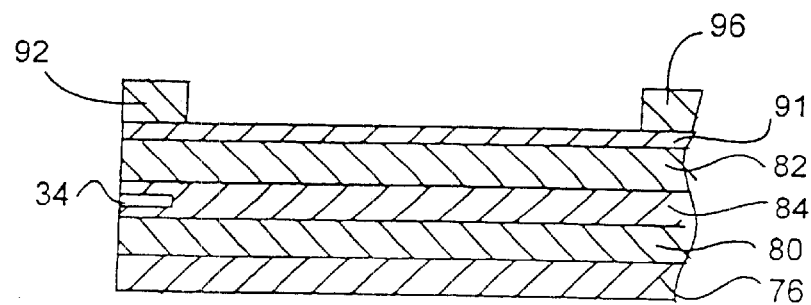
Figure 7:
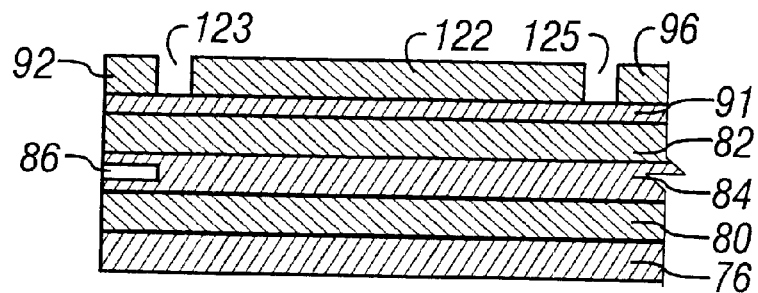
Figure 8:
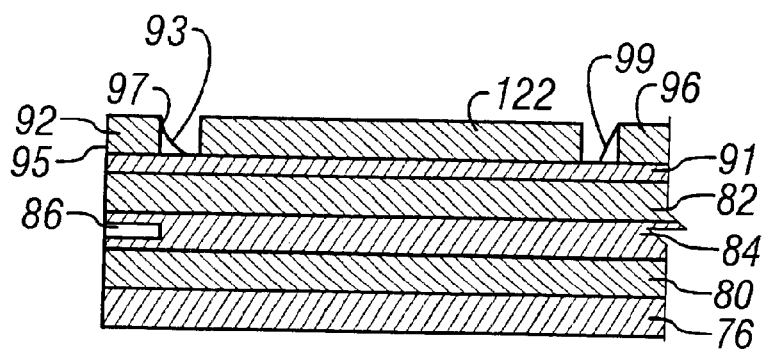

In step 208, photoresist hard mask patterns are defined and may include patterning the pedestal 92, backgap 96, and stud (not shown). Step 208 is shown in FIG. 6. After the pedestal 92 and backgap 96 are formed, a hard photoresist mask 122 is formed on the spacer layer 91 between the pedestal 92 and backgap 96 in step 210 as shown in FIG. 7. The mask 122 is preferably spaced from the pedestal 92 by about 2–3 um and from the backgap 96 by about 1 um to form two well structures 123 and 125. A second plating operation of the pedestal 92, backgap 96 and well structures 123 and 125 is performed in step 212 and results in the first and second outwardly extending portions 93 and 99 formed due to the increased current density at the pedestal 92 and backgap 96 as shown in FIG. 8. The pedestal 92 is shown including the first planar air bearing surface 95 at the ABS and the opposing surface 97 facing the backgap 96. The tapered portion 93 extends outwardly from the opposing surface 97 toward the spacer layer 91 and the backgap 96. The outward tapered portion 93 reduces the formation of pinned magnetic domains in the pedestal 92 and provides improved flux passage which results in improved in NLTS and reduced popcorn noise in the read element 72.

Figure 9:
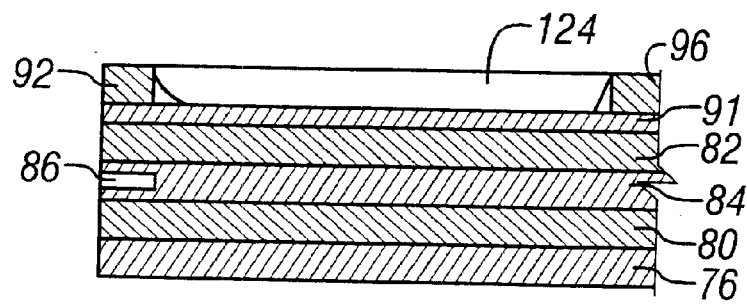
Figure 10:
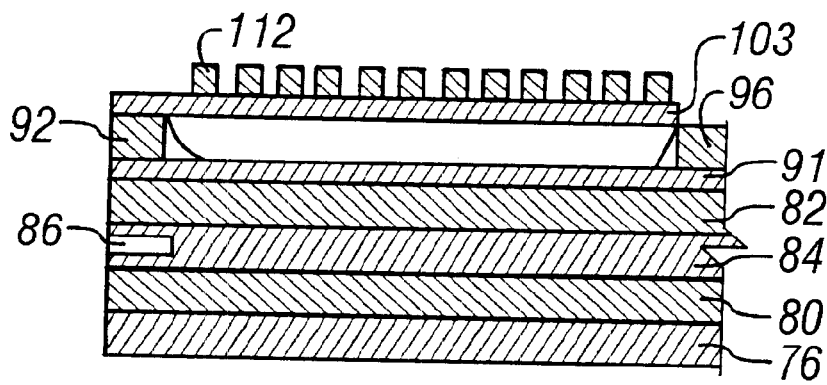

In step 214 (see FIG. 9) a second midcoat 124, preferably formed of $Al_2O_3$, is deposited on the wafer and planarized by CMP. The write element 74 is completed by standard processes in step 216 (see FIGS. 10 and 11).

In summary, the present invention provides a merged read/write head 70 having a first pole pedestal 92 including an outward tapered portion 93 that provides for reduced popcorn noise in the read element as well as improved NLTS.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A merged read/write head comprising:

a read element having a first shield layer, a second shield layer and a magnetoresistive element disposed between the first and second shield layers;

a spacer layer of nonmagnetic material formed upon the second shield layer; and an inductive write element having a pole pedestal formed upon the spacer layer and a second pole separated from the pedestal by a gap, the pole pedestal comprising a first air bearing surface and an opposing surface, the opposing surface having a tapered portion formed thereon.

2. A merged read/write head as recited in claim 1 wherein the nonmagnetic material is selected from a group consisting of Ta, Cu and Au.

3. A merged read/write head as recited in claim 1 wherein the spacer layer is less than 100 Angstroms thick.

4. A merged read/write head as recited in claim 1 wherein the spacer layer is 50 Angstroms thick.

5. A merged read/write head as recited in claim 1 wherein the tapered portion extends outwardly from the opposing surface toward the nonmagnetic layer and a backgap portion.

* * * * *